United States Patent [19]

Itoh et al.

[11] 3,883,419
[45] May 13, 1975

[54] PROCESS FOR PREPARING PLATINUM-TIN REFORMING CATALYSTS AND USE THEREOF

[75] Inventors: Takuji Itoh; Ikuo Akitsuki, both of Ohi-machi, Japan

[73] Assignee: Exxon Research and Engineering Company, Linden, N.J.

[22] Filed: Oct. 17, 1973

[21] Appl. No.: 407,176

[52] U.S. Cl.............. 208/138; 208/139; 252/441; 252/466 PT
[51] Int. Cl..... C10g 35/08; B01j 11/78; B01j 11/08
[58] Field of Search....... 208/138, 139; 252/466 PT, 252/441

[56] References Cited
UNITED STATES PATENTS

| | | | |
|---|---|---|---|
| 3,511,888 | 5/1970 | Jenkins | 208/138 |
| 3,631,215 | 12/1971 | Clippinger et al. | 260/673.5 |
| 3,660,309 | 5/1972 | Hayes et al. | 208/139 |
| 3,691,102 | 9/1972 | Swift | 252/466 PT |
| 3,700,588 | 10/1972 | Weisang et al. | 28/139 |
| 3,702,293 | 11/1972 | Hayes et al. | 208/139 |
| 3,725,304 | 4/1973 | Wilhelm | 252/441 |
| 3,745,112 | 7/1973 | Rausch | 208/139 |
| 3,759,841 | 9/1973 | Wilhelm | 252/441 |
| 3,825,503 | 7/1974 | Patrick et al. | 252/466 PT |

Primary Examiner—Delbert E. Gantz
Assistant Examiner—James W. Hellwege
Attorney, Agent, or Firm—J. E. Luecke

[57] ABSTRACT

Supported platinum group metal-tin hydrocarbon conversion catalysts are prepared by (1) impregnating a refractory inorganic oxide support with an aqueous solution of a halogen acid containing a platinum group metal component; (2) drying the platinum group metal impregnated carrier; (3) impregnating the dried platinum group metal impregnate with a solution of a divalent tin compound in a non-oxidizing and non-reducing atmosphere; and (4) drying the resulting impregnate.

9 Claims, 4 Drawing Figures

3,883,419

PROCESS FOR PREPARING PLATINUM-TIN REFORMING CATALYSTS AND USE THEREOF

BACKGROUND OF THE INVENTION

1. Field of the Invention

The present invention relates to (a) a process of preparing a hydrocarbon conversion catalyst, particularly a catalyst useful in petroleum refining and petrochemical processing, such as hydrocarbon reforming operations; (b) an improved hydrocarbon conversion catalyst; and (c) an improved naphtha reforming process. More particularly, this invention relates to an improved catalyst comprising a complex compound of a platinum group component and a tin component associated with a refractory inorganic oxide carrier, a process for preparing the improved catalyst, and to the use of the improved catalyst in a naphtha reforming process.

2. Description of the Prior Art

Platinum-tin hydrocarbon conversion catalysts have been described previously in the literature. Netherlands application No. 70,13354, and U.S. Pat. Nos. 3,632,525; 3,584,060; 3,679,601; 3,725,304; 3,631,215; 3,511,888 and 3,531,543 contain disclosures relating to hydrocarbon conversion catalysts containing platinum group metal and tin constituents. Additionally, we, in Japanese Patent Application No. 243337/1971, have disclosed the existence of catalysts comprising a supported platinum-tin composite. Finally, the existence of complex compounds of platinum chloride and tin chloride and their use as promoters for the hydrogenation of olefins of fatty acids in a homogenous system has been reported in the Journal of the American Chemical Society, Volume 25, 1681 (1963).

SUMMARY OF THE INVENTION

In accordance with the present invention, it has been discovered that highly effective hydrocarbon conversion catalysts, in particular naphtha reforming catalysts, comprising a supported complex compound of a platinum group metal constituent and a tin constituent can be secured utilizing the preparation technique of the present invention. The preparation technique comprises impregnating a refractory inorganic oxide carrier or support with an aqueous solution of a halogen acid containing a platinum group metal component, drying the resulting platinum group metal-refractory inorganic oxide impregnate, impregnating the platinum group metal component-refractory inorganic oxide impregnate with a solution of a divalent tin compound in a non-oxidizing and non-reducing atmosphere; and drying the resulting impregnate. Following the second drying operation it is preferred that the completed impregnate be calcined at elevated temperature to form thereby, in situ, a complex compound of the platinum group metal component and the tin component on the surface of the carrier material. While the catalyst may be employed to promote a wide variety of hydrocarbon conversion processes, the catalyst has particular utility in promoting the conversion of naphtha materials to higher octane gasoline products.

Figure 1:
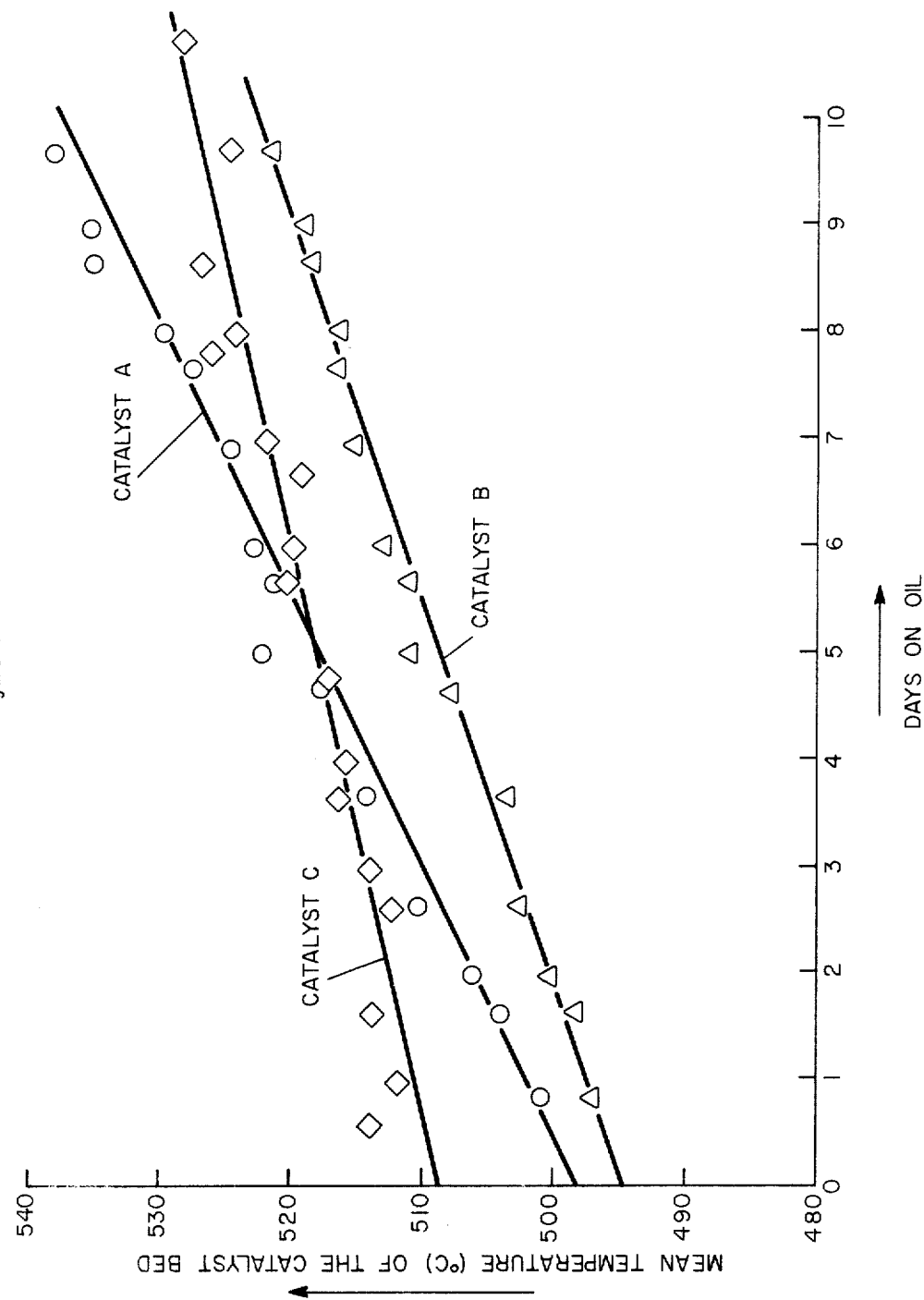
FIGS. 1 and 2 illustrate the relationship between the temperature necessary to maintain a constant product octane level in a naphtha reforming operation and duration of on-oil contacting.

Any of the usual refractory inorganic oxides may be used as the carrier or support constituent of the catalyst of this invention. For instance, there may be used such refractory carriers as alumina, bentonite, clay diatomaceous earth, zeolite, silica, magnesia, zirconia and thoria. The use of alumina is especially preferred. Mixtures of alumina with minor amounts, e.g., from about 1 to 20 percent by weight, of other refractory materials may be used. Specifically, alumina-silica, alumina-zirconia, alumina-silica-magnesia and the like may be employed. It is preferred that the carrier be a porous substance having a specific surface area of at least about 50 square meters per gram. Preferred examples of alumina that are useful as the catalyst support are gamma-alumina, eta-alumina, and chi-alumina. These materials have a specific surface area of at least about 130 square meters per gram, a bulk density of about 0.3 to about 0.8 grams per milliliter, an average pore volume of about 0.3 to 1.2 milliliters per gram and an average pore diameter of about 40 to 300 A.

Useful platinum group metals belong to Group VIII of the Periodic Table and include light platinum group metals such as ruthenium, rhodium and palladium and heavy platinum group metals such as osmium, iridium and platinum. The use of platinum is especially preferred. In the impregnation operation, it is preferred that the platinum group metals be used in the form of soluble compounds. The impregnation solution containing the platinum group metal component is prepared by dissolving a soluble compound of the platinum group metal in an aqueous solution of a halogen acid (a hydrogen halide). The chemical indentity of the soluble compound used is not particularly critical and any of the soluble compounds may be employed. However, use of halogen-containing soluble compounds is particularly preferred. Useful platinum components include platinum nitrate, halogenplatinic acid, and ammonium halogenplatinate, platinum halide, etc. Chloroplatinic acids, such as hexachloroplatinic acid and tetrachloroplatinic acid, ammonium chloroplatinate and the like are particularly preferred. It is also possible to employ a polyamine salt of platinum.

The impregnating medium is preferably a dilute aqueous solution of hydrochloric acid and it is desired that the concentration of acid in the solution be maintained between 0.005 to 0.5 normality, especially between 0.01 and 0.3 normality with a pH of less that 4, preferably less than 3. The acid concentration in the aqueous impregnating solution has an inlfuence on the degree to which the active ingredient enters into the interior of the support or carrier from the surface thereof.

The concentration of the platinum group metal component in the impregnation solution is dependent upon the amount of platinum group metal desired to be supported on the carrier as well as other factors. It is generally preferred that the concentration be maintained within the range of from about 0.005 to 0.05 moles per liter, calculated as elemental metal.

The impregnation solution containing the tin component may be an organic or aqueous solution of a divalent tin compound, preferably a stannous halide, most preferably stannous chloride. It is possible to employ an impregnating solution comprising a mixture of an organic solution of the tin compound and an aqueous solution of the tin compound. Useful organic solvents include alcohols, ethers, and ketones. The use of an alcohol, especially a lower aliphatic alcohol, such as methanol, is preferred. When an aqueous solution of the tin component is employed, it is desirable that the aqueous solution contain a halogen acid (a hydrogen halide) in a concentration varying from about 0.002 to 0.3 normality. A dilute aqueous solution of hydrochloric acid is a particularly useful medium for the tin component. When an aqueous solution of a halogen acid is used, the pH of the solution is adjusted to less than about 6, preferably less than about 5. Typically, the tin concentration of the impregnation solution is maintained within the range of from about 0.001 to 0.1 moles per liter.

The impregnation operation of the present invention is conducted by admixing the carrier with the aqueous solution of the above-mentioned platinum group metal component to produce an impregnate containing from 0.01 to about 3.0 percent by weight of platinum group metal based upon the weight of the catalyst. Typically, the carrier is in contact with the impregnation solution at room temperature for more than about 10 hours; however, other conditions may be employed to produce an impregnate that contains the above-mentioned quantities of platinum component. The platinum group metal containing impregnate is then separated from the impregnation solution by filtration or by using other similar processes. The impregnate is then washed to remove any unnecessary accumulations therefrom and dried using process conditions described hereinafter.

The dried platinum group metal impregnate is subjected thereafter to impregnation with the tin component. It is essential that the tin material of the impregnating solution be maintained at a valence of 2 and the impregnation is conducted accordingly in an inert atmosphere to prevent odixation and/or reduction of the tin constituent. Divalent tin components in the impregnating solution, for example stannous chloride, is oxidized readily to change its valence state from 2 to 4 in an oxidizing atmosphere and is reduced to a valence of 0 in a reducing atmosphere. Oxidation or reduction of the tin constituent prevents the formation of the desired highly dispersed complex of the platinum group metal component and tin halide on the support wth the result that the desired high catalytic activity of the resulting product will not be secured. Accordingly, the impregnation of the platinum group metal impregnate with the tin component is conducted preferably in an inert gas atmosphere, such as nitrogen. The tin halide impregnation operation is conducted in the manner as the platinum group component impregnation to introduce from 0.05 to 10 percent by weight, based on total catalyst, of the tin component into the impregnate. Following the tin impregnation, the impregnate is separated from the impregnation solution using conventional techniques and thereafter washed. An alcohol is preferably used as the washing medium. The washed catalyst is thereafter dried and calcined. The final catalyst, prepared in the manner indicated, will contain halogen, preferably chlorine, in the range of from about 0.1 to 5 percent by weight, based on total catalyst. If desired, additional amounts of halogen, preferably chlorine, can be introduced into the catalyst using conventional techniques.

The drying step conducted after each of the impregnation steps of the catalyst manufacturing process is carried out by heating the impregnate at a temperature in excess of about 80°C, preferably at a temperature varying from 80° to 100°C in a nitrogen or air atmosphere. If desired, the catalyst can be dried using a filtration-type process at temperature below about 80°C. The final calcination operation is conducted by heating the final impregnate at a temperature ranging from about 400° to about 700°C.

The hydrocarbon conversion catalyst of the present invention may be employed in various physical forms. For example, the catalyst may be employed in the shape of spheres, tablets, cylindrical extrudates or the like. It is usual that the carrier or support material be formed into the desired shape prior to impregnation and subjected to a drying and calcination operation, preferably at the temperature conditions described above, prior to its being subjected to the impregnation step.

The active component of the platinum group metal-tin halide complex catalyst of this invention, is in the case of platinum, believed to have the following structure:

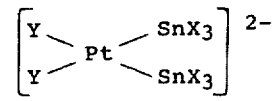

in which X designates a halogen atom and Y represents a halogen atom or other constituent.

As can be seen from the above structure, the mole ratio of tin to platinum group metal in the catalyst complex is believed to be 2.0 and the tin is believed to to be in a divalent form. Although it is not clear why the composition prepared as indicated possesses excellent catalytic characteristics, they may be attributed to the fact that the complex of the platinum group metal and tin halide is highly dispersed substantially in the form of a unit compound on the support material which has a large specific surface area and that the ligand of the complex gives a weak acidic point and, at the same time, prohibits the combination of the platinum group metal atoms present with each other thus preventing the reduction of active points due to agglomeration and crystalization.

As noted earlier, the catalyst of the present invention is especially suited as a promoter for naphtha reforming processes. In the naphtha reforming process, the naphtha feed stock and hydrogen are contacted with the catalyst at a temperature varying from 300° to 600°C, preferably from between 350° and 550°C, at a pressure less than 15 kilograms per square centimeter, preferably at a pressure less than 10 kilograms per square centimeter, at a space velocity ranging from 0.1 to 10 weight parts of feed stock per hour per weight of catalyst (W/H/W), preferably at a space velocity varying from about 1 to 5 W/H/W and at a hydrogen to hydrocarbon mole ratio ranging from about 0.5 to 20, preferably between 1 and 10. It is preferred that the hydrogen employed in the reforming process be of at least 80 percent purity. Preferably, the process feed stock is a light hydrocarbon oil such as naphtha fraction or a kerosene fraction, that is materials that boil at atmospheric pressures at temperatures in the range of from 30 to 350°C.

DESCRIPTION OF THE PREFERRED EMBODIMENTS

EXAMPLE 1

Chloroplatinic acid (6.35 grams of $H_2PtCl_6 \cdot 6H_2O$) was dissolved in 2 liters of a 0.1 normal aqueous hydrochloric acid solution. Four hundred grams of commercially available alumina carrier having a specific surface area of 180 square meters per gram and in the form of extrudates of 1.5 m/m in diameter was calcined in a muffle furnace at 500°C for 2 hours and was impregnated thereafter with the chloroplatinic acid solution for 48 hours. The impregnate was then filtered, washed, dried at 100°C. for 3 hours and then calcined in a muffle furnace at 500°C for 2.5 hours. The catalyst, which contained about 0.6 wt.% platinum, was designated Catalyst A.

Stannous chloride (6.23 grams of $SnCl_2 \cdot 2H_2O$) was dissolved in two liters of methanol. A batch of platinum impregnate identical to Catalyst A, except that it was not subjected to the final calcination step, was impregnated with the entire stannous chloride solution in a nitrogen atmosphere. The formation of a complex between the platinum and tin chloride was noted by the change of color of the alumina surface from lemon yellow to a yellowish orange. The stannous chloride impregnation was carried out for 48 hours. Following the impregnation, the methanol solution was removed from the impregnate, the catalyst washed with methanol, dried at 100°C for 3 hours and then calcined in muffle furnace at 500°C for 2 hours. This catalyst was designated Catalyst B. Catalyst B consisted of about 0.6 wt.% platinum and about 0.73 wt.% tin to provide a platinum:tin mole ratio of about 1:2.0.

Chloroplatinic acid (5.40 grams of $H_2PtCl_6 \cdot 6H_2O$) was dissolved in two liters of methanol and 5.7 grams of stannous chloride ($SnCl_2 \cdot 2H_2O$) was added to that solution to form a yellowish orange platinum-tin chloride complex. Four hundred grams of the same calcined alumina carrier that was employed in the preparation of Catalysts A and B was impregnated with the above complex solution. After a 48 hour impregnation period, the methanol solution was removed from the impregnate, the catalyst dried at 100°C for 3 hours and then calcined in a muffle furnace at 500°C for 2 hours. This catalyst was designated Catalyst C. Catalyst C contained about 0.51 wt.% platinum and 0.75 wt.% tin to provide a platinum: tin mole ratio of about 1:2.4.

Samples of Catalysts A, B, and C were then tested in naphtha hydroforming service wherein each catalyst was contacted with hydrogen and a straight run naphtha fraction from a Middle East crude and having a boiling range at atmospheric pressure of about 90° to 175°C and a sulfur content of 0 percent. The processing was carried out at a reaction zone pressure of 10 kilograms per square centimeter, a hydrogen to hydrocarbon mole ratio of 8.0 and a space velocity of 1.5 W/H/W. The reaction zone temperature (means temperature of the catalyst bed) was maintained at a level necessary to maintain the research octane number of the reformate product at 101.5. The tests were carried out for a period of from 9 to 10 days and the results thereof are set forth in FIG. 1. From FIG. 1, it is apparent that Catalyst B has a higher activity than either Catalyst A or C in that the temperature needed to produce the desired octane level is considerably below that required for Catalyst A and C. Further, Catalyst B has excellent activity maintenance characteristics since the rate of temperature increase needed to maintain the high octane product level is less than Catalyst A.

EXAMPLE 2

Chloroplatinic acid (3.19 grams of $H_2PtCl_6 \cdot 6H_2O$) was dissolved in two liters of a 0.1 normal aqueous hydrochloric acid solution. Four hundred grams of the same calcined alumina support employed in Example 1 was impregnated with the above solution for 48 hours. The impregnated catalyst was then recovered by filtration, washed, and dried at 100°C for 3 hours and calcined in a muffle furnace at 500°C for 2 hours. The catalyst, which contained about 0.32 wt.% platinum, was designated Catalyst D.

A catalyst, identical in amount and preparation to Catalyst A except that the final calcining operation was not performed, was impregnated for 48 hours in a nitrogen atmosphere with a stannous chloride solution comprising 3.50 grams of $SnCl_2 \cdot 2H_2O$ dissolved in two liters of methanol. The resulting impregnate was removed from the methanol solution, washed with methanol, dried at 100°C for 3 hours and then calcined in a muffle furnace at 500°C for 2 hours. This catalyst, which contained 0.32 wt.% platinum and 0.46 wt.% tin and exhibited a platinum to tin molar ratio of about 1:2.36, was designated Catalyst E. Following the procedure or Example 1, Catalysts D and E were tested for catalyst activity and catalyst activity maintenance characteristics in a naphtha reforming environment. As in Example 1, the reforming tests were carried out at a temperature (mean temperature of the catalyst bed) sufficient to maintain a product octane number of 101.5. Additionally, yield measurements were made during the course of the test period to determine $C_5+$ yield decline over the course of the run. The results of the tests are set forth in FIGS. 2 and 3.

Figure 2:
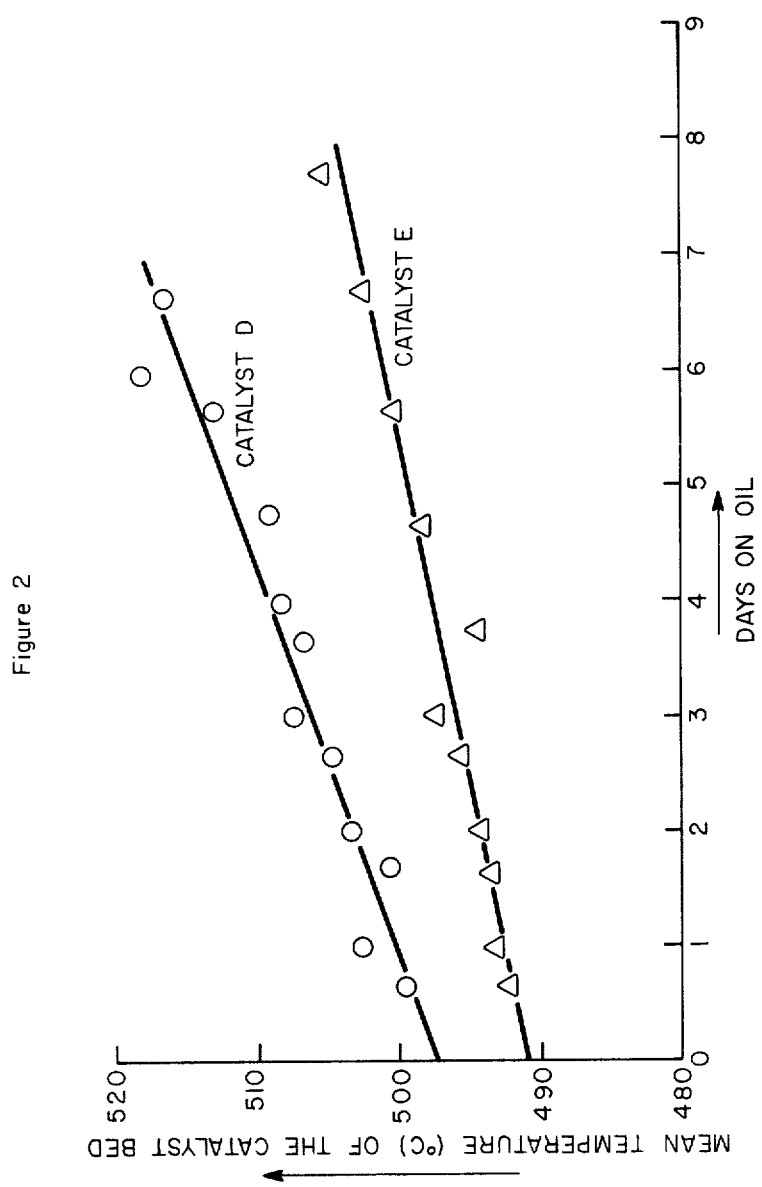
Figure 3:
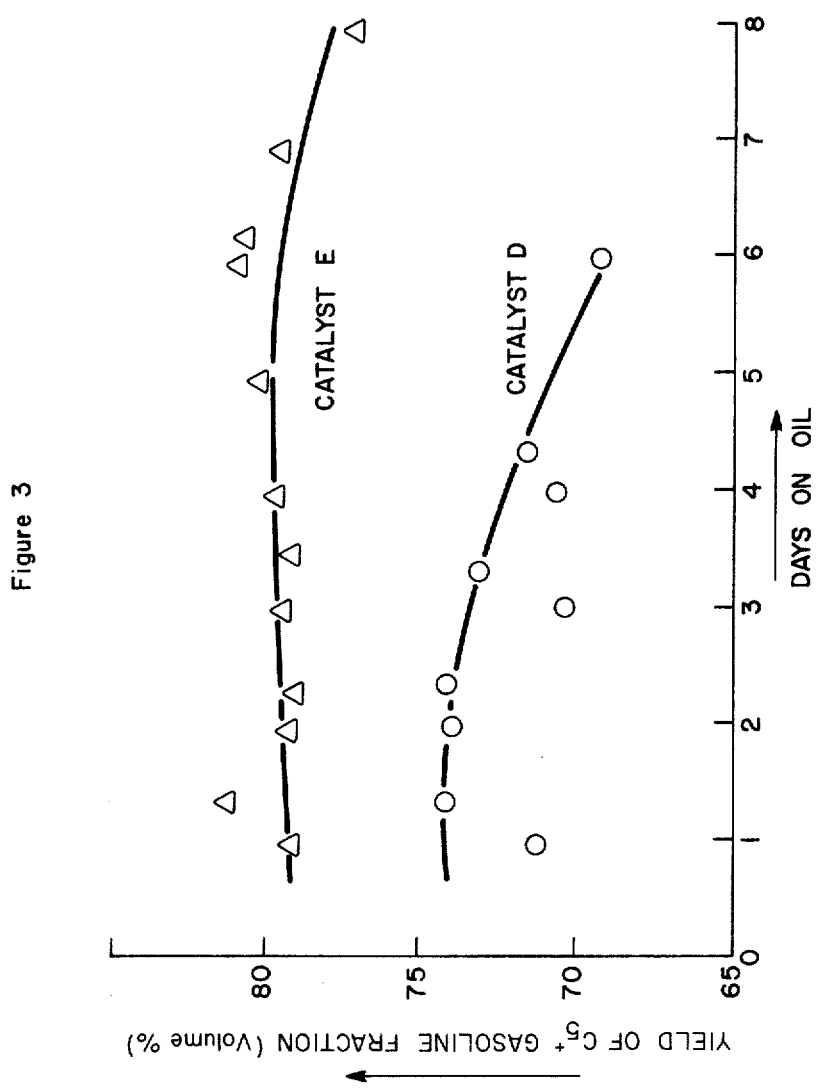
FIG. 3 illustrates the relationship between gasoline yield in a naphtha reforming process and duration of on-oil contacting.

FIG. 2 illustrates that the catalyst of the present invention (Catalyst E) is superior to a conventional platinum catalyst in both activity and activity maintenance characteristics. FIG. 3 illustrates that the yield decline experienced with the catalyst of the present invention is less than that experienced with a conventional platinum catalyst and that the selectivity to the desired $C_5+$ product is much greater for the catalyst of the present invention than for a conventional platinum catalyst.

EXAMPLE 3

Figure 4:
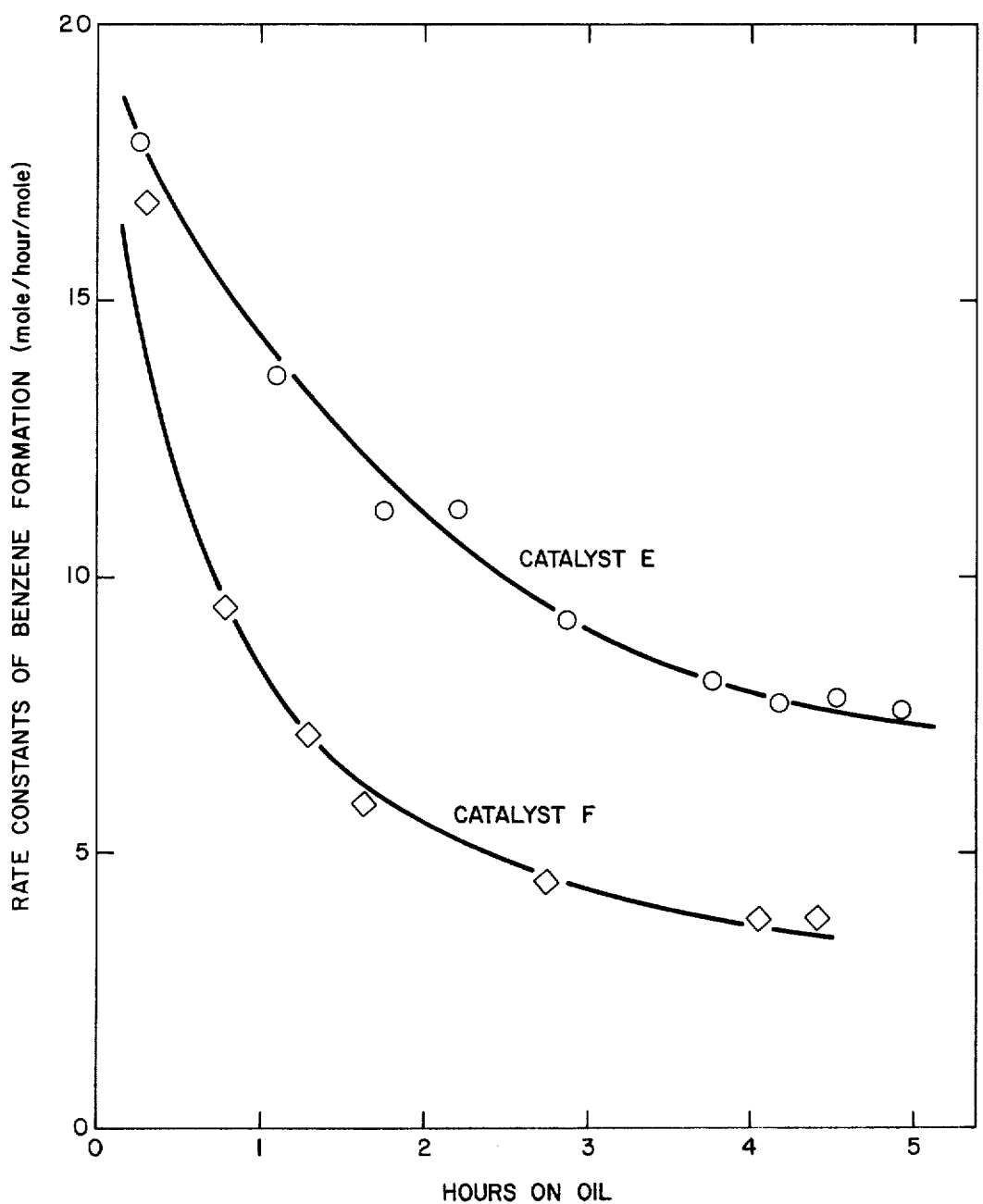
FIG. 4 demonstrates the decline of rate constants of benzene formation with time in a normal hexane dehydrocyclization reaction.

To demonstrate the criticality of employing an inert atmosphere during the impregnation of the tin halide, Catalyst E and a catalyst similar to Catalyst E but which was prepared contrary to the teachings of the present invention (Catalyst F) were compared for their ability to promote the dehydrocyclization of normal hexane to benzene. Catalyst F was prepared in exactly the same manner as Catalyst E with the exception that the contacting of the platinum impregnate with the stannous chloride solution was conducted in air rather than nitrogen. The dehydrocylization experiment was conducted at atmospheric pressure by contacting a sample of the catalyst with normal hexane and hydrogen at 500°C at a hydrogen to hexane mole ratio of 10 and at a space velocity of 1.0 W/H/W. During the onstream period the rate constant of benzene formation (mole/hour/mole) was calculated periodically for each of the two catalyst systems. The rate constant, in each instance, was determined by dividing the benzene concentration in the product (mole/mole) by the residence time of the normal hexane (hours). The results of the tests are depicted in FIG. 4. FIG. 4 illustrates that the activity and stability characteristics of the catalyst prepared following the procedure of the instant invention are markedly superior to the catalyst containing the identical constituents that were prepared by contacting a platinum/alumina impregnate with stannous chloride in air rather than in a non-oxidizing and non-reducing atmosphere.

What is claimed is:

1. A process for preparing a hydrocarbon conversion catalyst comprising a complex compound of a platinum group metal component and a tin component contained on a refractory inorganic oxide carrier which comprises:
   a. impregnating said refractory inorganic oxide carrier with an aqueous solution of a halogen acid containing a platinum group metal component;
   b. drying the platinum group metal componentimpregnated carrier;
   c. impregnating the dried platinum group metal component-impregnated carrier with a solution of a divalent tin compound, said impregnation conducted in a non-oxidizing and non-reducing atmosphere;
   d. drying the carrier impregnated with said platinum group component and tin component; and
   e. calcining the dried impregnate of step (d) at elevated temperatures.

2. The process of claim 1 wherein said divalent tin component is stannous chloride.

3. The process of claim 1 wherein said aqueous solution employed in step (a) contains hydrochloric acid.

4. The process of claim 1 wherein said platinum group metal component employed in step (a) is chloroplatinic acid.

5. The process of claim 1 wherein said solution employed in step (c) in an aliphatic alcohol solution.

6. The process of claim 1 wherein said carrier is alumina.

7. The process for preparing a hydrocarbon conversion catalyst comprising a complex compound of a platinum component and stannous chloride contained on alumina which comprises:
   a. impregnating the said alumina with an aqueous solution of hydrochloric acid containing a platinum component;
   b. drying said platinum component-alumina impregnate;
   c. impregnating the dried platinum componentalumina impregnate with a solution of stannous chloride in a non-oxidizing and non-reducing atmosphere;
   d. drying the impregnate from step (c); and
   e. calcining said dried impregnate from step (d) by heating the same at a temperature varying from 400° to about 700°C.

8. An improved hydrocarbon conversion catalyst comprising a complex compound of a platinum group component and a tin component contained on a refractory inorganic oxide carrier, said catalyst prepared by a process comprising:
   a. impregnating said refractory inorganic oxide carrier with an aqueous solution of a halogen acid containing a platinum group metal component;
   b. drying the platinum group metal componentimpregnated carrier;
   c. impregnating the dried platinum group metal component-impregnated carrier with a solution of a divalent tin compound, said impregnation conducted in a non-oxidizing and non-reducing atmosphere; and
   d. drying the carrier impregnated with said platinum group component and tin component; and (e) calcining the dried impregnate of step (d) at elevated temperatures.

9. A naphtha reforming process which comprises contacting a naphtha feed stock and hydrogen under reforming conditions with a catalyst comprising a complex compound of a platinum group metal component and a tin component contained on a refractory inorganic oxide carrier, said catalyst prepared by the method comprising:
   a. impregnating said refractory inorganic oxide carrier with an aqueous solution of halogen acid containing a platinum group metal component;
   b. drying the platinum group metal componentimpregnated carrier;
   c. impregnating the dried platinum group metal component-impregnated carrier with a solution of a divalent tin compound, said impregnation conducted in a non-oxidizing and non-reducing atmosphere; and
   d. drying the carrier impregnated with said platinum group component and tin component; and
   e. calcining the dried impregnate of step (d) at elevated temperatures.

* * * * *